Patented Aug. 6, 1929.

1,723,457

UNITED STATES PATENT OFFICE.

MAX DOHRN AND RALPH DIRKSEN, OF BERLIN-CHARLOTTENBURG, GERMANY, ASSIGNORS TO THE FIRM CHEMISCHE FABRIK AUF ACTIEN (VORM E. SCHERING.), OF BERLIN, GERMANY.

CHLORO-IODIDES OF 2-AMINO-PYRIDIN-SALTS AND PROCESS OF MAKING SAME.

No Drawing. Application filed January 5, 1927, Serial No. 159,241, and in Germany January 15, 1926.

Our invention refers to new products resulting from the interaction of α-amino pyridin and its derivatives with iodine chloride compounds and to the method of producing same, the products being useful in the production of medical preparations.

We have ascertained that if iodine chloride is allowed to act in acid solution on α-amino pyridin and its derivatives, there are formed precipitates which are insoluble in acids and which are salts of the iodine chloride compounds of α-amino pyridin or its derivatives. In the majority of cases these salts are well crystallized and substantially stable. They are not decomposed when boiled in acid solution and, on cooling such solution separate out under the form of crystals.

All these compounds are capable of forming in alkaline solution the corresponding β'-iodine derivatives of the base.

Example 1.

5, 8 grams α-amino pyridin are dissolved in 40 c c dilute hydrochloric acid and a solution of 10 grams iodine chloride in 20 c c dilute hydrochloric acid is added, whereupon the hydrochloride of the iodine chloride compound of α-amino pyridin will separate out in beautiful needles melting at 141°, these needles being the color of lemon yellow. The compound has the formula

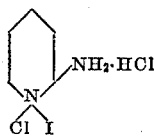

Example 2.

8, 4 grams α-acetyl amino pyridin are treated with 10 grams iodine chloride as described with reference to Example 1. The corresponding salt, which separates out, has the melting point of 155°. The compound has the formula

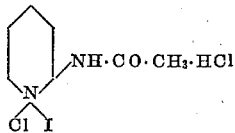

Example 3.

7, 6 grams α-ethyl amino pyridin, when treated as described with reference to Example 1, result in a compound melting at 90–91°. The compound has the formula

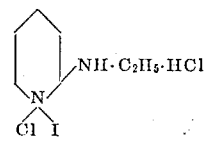

Example 4.

8, 4 grams α-isopropyl amino pyridin (which is obtained from α-amino pyridin sodium and isopropyl iodide) when treated in accordance with Example 1, yield a crystalline salt of a bright yellow color, melting between 84–86°. The compound has the formula

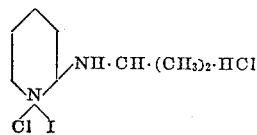

Example 5.

10 grams α-isoamyl amino pyridin (which is obtained from α-amino pyridin sodium and isoamyl bromide), when treated in accordance with Example 1, yield a crystallizing compound melting at 50–51°. The compound has the formula

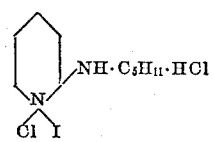

Example 6.

α-diethyl amino pyridin, if treated as described with reference to Example 1, yields the hydrochloride of the iodine chloride compound melting at 54–55°. It has the formula

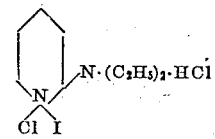

Example 7.

8, 4 grams α-amino-α'-methyl-β-ethyl pyridin, when treated in accordance with Example 1 result in a product melting at 105–106°. It has the formula

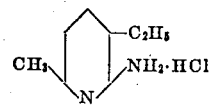

Other salts can be obtained in an analogous manner.

Various changes may be made in the details of the operation and particularly in the proportions of the ingredients present in the solutions without departing from the invention or sacrificing the advantages thereof. We claim:—

1. As a new product, a salt of the iodine-chloride compound of α-amino pyridin having the formula

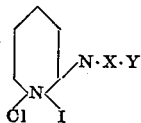

in which X=H or alkyl, Y=H or alkyl or acyl, and wherein free positions of the pyridin nucleus can be substituted as well, such salts being as a rule crystallized and substantially stable even when boiled in acid solution from which they segregate on cooling in the form of crystals, the compounds being capable of being transformed in alkaline solution into the corresponding β'-iodine derivatives of the base with a good yield.

2. As a new product the hydrochloride of the iodine chloride compound of α-isoamyl amino pyridin having the formula

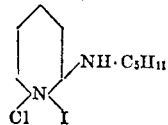

such salt being crystallized and substantially stable and having a melting point of 50–51° C., the compound being capable of being transformed in alkaline solution with a good yield into the β'-iodine derivative.

3. The method of producing iodine chloride compounds of α-amino pyridin and its derivatives comprising treating the raw material with iodine chloride in acid solution.

4. The method of producing the iodine chloride compound of α-isoamyl amino pyridin comprising treating a solution of 10 parts by weight α-isoamyl amino pyridin in about 40 parts dilute hydrochloric acid with a solution of 10 parts iodine chloride in about 20 parts dilute hydrochloric acid.

In testimony whereof we affix our signatures.

MAX DOHRN.
RALPH DIRKSEN.